(12) United States Patent
Hill et al.

(10) Patent No.: US 10,371,916 B2
(45) Date of Patent: Aug. 6, 2019

(54) OPTICAL FIBER PATHWAY DUCT

(71) Applicant: Clearfield, Inc., Minneapolis, MN (US)

(72) Inventors: John Paul Hill, Andover, MN (US); William J. Cruzen, Monticello, MN (US)

(73) Assignee: Clearfield, Inc., Minneapolis, MN (US)

( * ) Notice: Subject to any disclaimer, the term of this patent is extended or adjusted under 35 U.S.C. 154(b) by 0 days.

(21) Appl. No.: 15/411,177

(22) Filed: Jan. 20, 2017

(65) Prior Publication Data

US 2019/0033549 A1    Jan. 31, 2019

(51) Int. Cl.
*G02B 6/50* (2006.01)
*G02B 6/44* (2006.01)

(52) U.S. Cl.
CPC ......... *G02B 6/4465* (2013.01); *G02B 6/4457* (2013.01); *G02B 6/50* (2013.01)

(58) Field of Classification Search
CPC ...... G02B 6/4465; G02B 6/4457; G02B 6/50; G02B 6/54
See application file for complete search history.

(56) References Cited

U.S. PATENT DOCUMENTS

| 4,961,623 | A | * | 10/1990 | Midkiff | G02B 6/444 385/135 |
| 5,783,778 | A | * | 7/1998 | Foss | H02G 15/013 174/77 R |
| 5,824,957 | A | * | 10/1998 | Holshausen | F16G 13/16 174/135 |
| 2010/0243096 | A1 | * | 9/2010 | Berglund | G02B 6/4459 138/107 |

FOREIGN PATENT DOCUMENTS

JP    06005324 U   *  1/1994

* cited by examiner

*Primary Examiner* — Omar R Rojas
(74) *Attorney, Agent, or Firm* — Pepper Hamilton LLP

(57) ABSTRACT

An optical fiber pathway duct comprises a first channel configured to receive a pulling mechanism, and a second channel configured to allow one of a pullable connector and a stub end coupled to an optical fiber cable to pass through the optical pathway duct. The optical fiber pathway duct further comprises a slot disposed between the first channel and the second channel and configured to allow a pulling eye of one of the pullable connector and the stub end coupled to the pulling mechanism to pass through the optical pathway duct.

16 Claims, 6 Drawing Sheets

OPTICAL FIBER PATHWAY DUCT

TECHNICAL FIELD

The present disclosure relates generally to optical fiber pathways and specifically to ducts configured for pushing and pulling optical fiber cables.

BACKGROUND

Data, voice, and other communication networks are increasingly using fiber optics to carry information. In a fiber optic network, each individual fiber is generally connected to both a source and a destination device. Additionally, along the fiber optic run between the source and the destination, various connections or couplings may be made on the optical fiber to adjust the length of the fiber or to provide termination connection ports for end users at which one or more fibers may be branched from a feed cable.

To interconnect the cables, various cable connector designs provide for low insertion loss and stability. Some example connectors may include, but are not limited to, SC, Dual LC, LC, ST and MPO connectors. In most of these designs, ferrules (one in each connector, or one in the connector and one in the apparatus or device), each containing an optical fiber end, are butted together end to end and light travels across the junction.

With the increasing desire for completely optical networks, "fiber to the premises" (FTTP) or "fiber to the home" (FTTH) systems are being developed to provide optical fibers that extend from the source to the site of the end-user. For example, optical fibers must be routed from a fiber consolidation, distribution or protection point to multiple subscribers in a multi-dwelling unit (MDU). For efficient deployment of optical fibers to subscribers in an MDU, there is a need for cable management solutions that allow management and routing of pre-terminated drop cables that are either connectorized or have a stub end.

SUMMARY

According to one aspect, there is provided an optical fiber pathway duct comprising a first channel configured to receive a pulling mechanism and a second channel configured to allow one of a pullable connector and a stub end coupled to an optical fiber cable to pass through said optical pathway duct. The optical fiber pathway further comprises a slot disposed between the first channel and the second channel and configured to allow a pulling eye of one of the pullable connector and the stub end coupled to the pulling mechanism to pass through said optical pathway duct.

In some embodiments, the second channel may be configured to house a plurality of previously deployed optical fiber cables. In some embodiments, the first channel may have a first cross-sectional area and the second channel may have a second cross-sectional area that is different from the first cross-sectional area. Some embodiments may further comprise a housing made of a flexible material configured to allow spooling. In some embodiments, the housing may be further configured to protect said optical fiber cable.

According to another aspect, there is provided an optical fiber pathway assembly comprising a reel configured to store a pre-terminated optical fiber cable, and an optical fiber pathway duct. The optical fiber pathway duct comprises a first channel configured to receive a pulling mechanism, a second channel configured to allow a pullable connector of the pre-terminated optical fiber cable to pass through said optical pathway duct, and a slot disposed between the first channel and the second channel and configured to allow a pulling eye of the pullable connector coupled to the pulling mechanism to pass through said optical pathway duct.

In some embodiments of the optical fiber pathway assembly, the second channel may be further configured to house a plurality of previously deployed optical fiber cables. In some embodiments, the first channel may have a first cross-sectional area and the second channel may have a second cross-sectional area that is larger than the first cross-sectional area. In some embodiments of the optical fiber pathway assembly, the optical fiber pathway duct may further comprise a housing made of a flexible material configured to allow spooling. The housing may be further configured to protect said pre-terminated optical fiber cable.

The present disclosure is not limited in terms of the particular embodiments described in this application, which are intended as illustrations of various aspects. Many modifications and variations can be made without departing from its spirit and scope, as will be apparent to those skilled in the art.

DETAILED DESCRIPTION

Aspects of the present disclosure are directed at optical fiber pathways and ducts configured to receive optical fiber cables that are connectorized or have a stub end. Various embodiments of optical fiber enclosures disclosed herein simplify fiber deployment. Embodiments may be used, for example, at multi-dwelling units (MDUs), to establish a pathway between a fiber consolidation, distribution, or protection point (e.g. a wall box) and multiple subscribers within the same pathway. In one example, a pathway with up to 12 subscribers may be established.

Embodiments of the optical fiber pathway ducts may be placed, unpopulated, on walls of an MDU. Various embodiments may have multiple placement methods (e.g. VHB tape) to accommodate adhesion to various building materials, such as drywall, stucco, brick, and wood paneling.

Various embodiments of the optical fiber pathway ducts may be made of a material that is flexible and may be spooled, similar for example to a microduct. but also have sufficient material hardness to provide physical fiber protection when fiber is placed or installed into it.

In various embodiments, the optical fiber pathway duct may be configured to provide varying cable sizes and drops, whether pre-terminated or not, in varying lengths, thereby providing connectivity between a fiber distribution point (e.g., wallbox) and the subscriber. In some embodiments, the same pathway may support up to twelve drop cables. One embodiment may be configured to provide about 900 μm of connectorized or pre-terminated drop cables.

Figure 1:
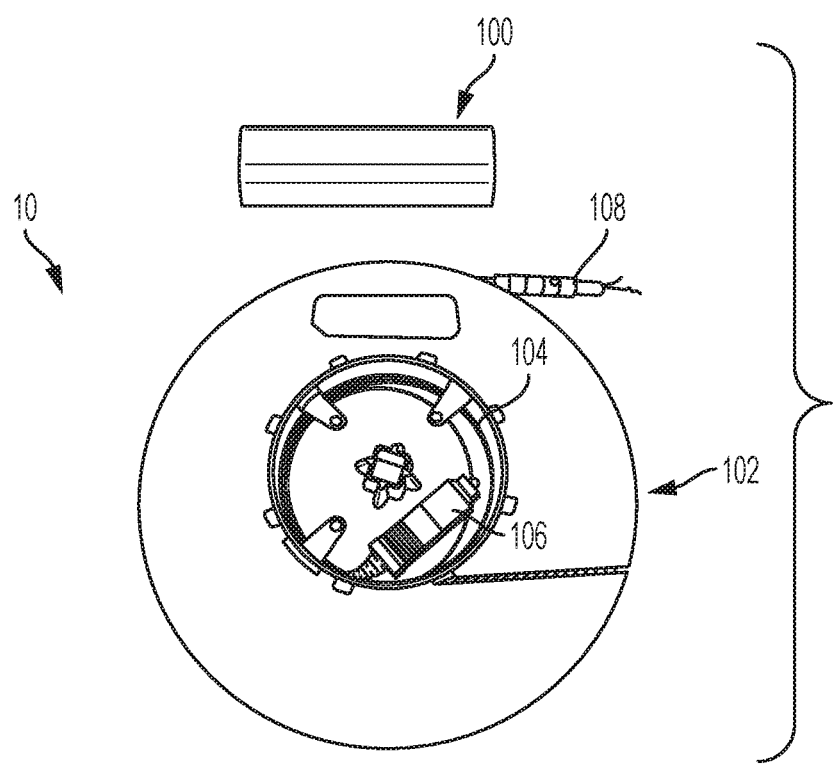
FIG. 1 is a perspective view of one embodiment of an optical fiber pathway assembly including a reel and an optical fiber pathway duct for a connectorized optical fiber cable according to aspects of the present disclosure.

FIG. 1 shows one embodiment of an optical fiber pathway assembly 10 including an optical fiber pathway duct 100 configured according to aspects of the present disclosure, and a reel 102 storing a drop cable 104. The drop cable 104 is pre-terminated or connectorized at both ends with connectors 106 and 108. The connector 108 is a pullable connector configured for being pulled through optical fiber pathways. In various embodiments, the drop cable 104 may be terminated with a stub end in lieu of a pullable connector.

Figure 2:
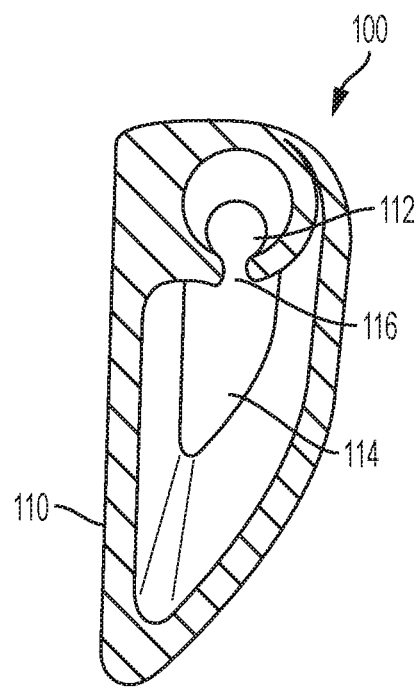
FIG. 2 is a cross-sectional view of the optical fiber pathway duct of FIG. 1 according to aspects of the present disclosure.

FIG. 2 shows a cross-sectional view of the optical fiber pathway duct 100. The optical fiber pathway duct has a housing 110 and two internal channels. The first channel 112 and the second channel 114 are separated by a slot 116. The first channel 112 provides a first pathway configured to receive and allow a pulling mechanism to pass through it, so as to pull through it a pre-terminated drop cable, such as a 900 μm drop cable (e.g. drop cable 102 of FIG. 1). The pulling mechanism may be a draw wire such as a steel fish tape, or a rodder, or any other type of pulling mechanism.

The second channel 114 is configured to provide sufficient space for a pushable/pullable connector of a pre-terminated drop cable to be pulled through it, while providing enough storage space for a plurality of previously deployed drop cables, such as twelve 900 μm drop cables. The slot 116 between the two channels is an opening configured to allow a string or pulling eye attached to the pullable connector, to pass through the optical fiber pathway duct 100.

In various embodiments, the optical fiber pathway duct 100 may be a tubular structure, and each of the internal channels 112 and 114 may be tubular. The second channel 114 may be larger than the first channel 112, to accommodate a pullable connector passing therethrough, and a plurality of drop cables. In other embodiments, the first channel may be larger or about the same size as the second channel. Each of the first channel 112 and the second channel 114 may have a different profile shape. For example, the first channel 112 may be cylindrically shaped, with a circular cross-sectional profile. The second channel 114 may have an elongated and larger cross-sectional area compared to the first channel 112. The second channel 114 may have a cross-sectional area greater than the cross-sectional area of the first channel. In various embodiments, the second channel may have a cross-sectional area different from the cross-sectional area of the first channel. In other embodiments, the channels may have similar profile shapes. The optical fiber pathway duct 100 may be oriented such that the first channel 112 is at the top and the second channel 114 is at the bottom of the duct.

During installation, a pulling mechanism such as a fish tape, coupled to a pulling eye or string of a pullable connector, will pass through the first channel 112, while the pre-terminated connector (attached to pulling eye) is pulled through (and on top of any previously pulled drop cables) through the second channel 114.

In various embodiments, the drop cable may be deployed from a reel, such as the reel 102 shown in FIG. 1, that may be placed at an access point entering a subscriber dwelling or MDU. The reel may be placed onto a pin so the wheel may rotate. Embodiments may further comprise a box configured to provide physical fiber protection and a landing point below the raceway or pathway. In some embodiments, a cover may be placed over the entire assembly after fiber is deployed back to the access point.

Figure 3:
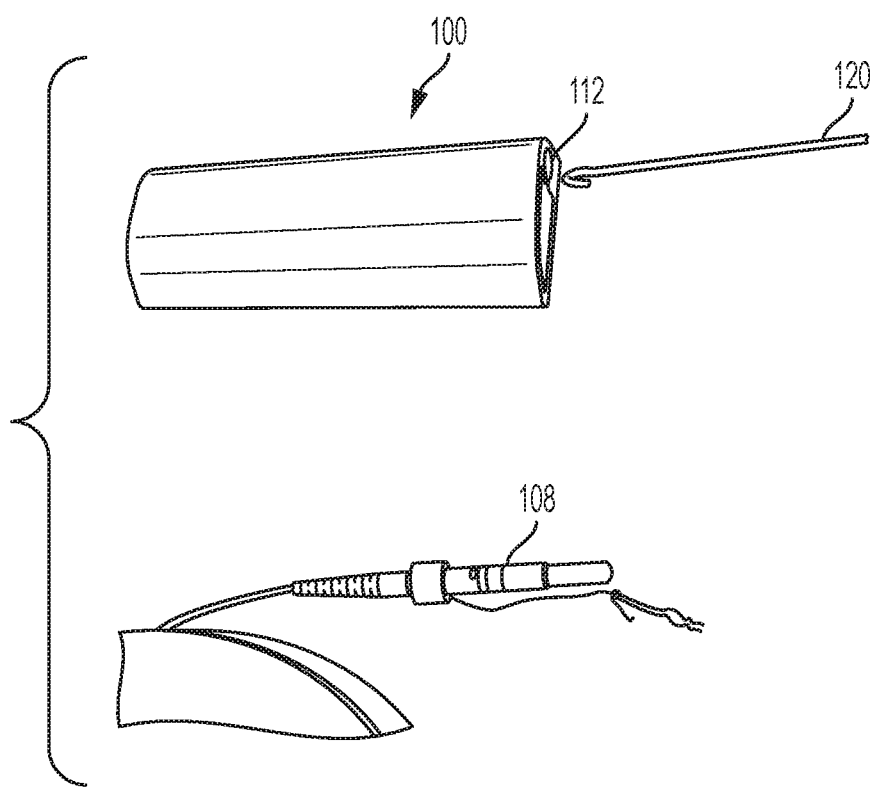
FIG. 3 shows the optical fiber pathway duct of FIG. 1 receiving a fish tape according to aspects of the present disclosure.
Figure 4:
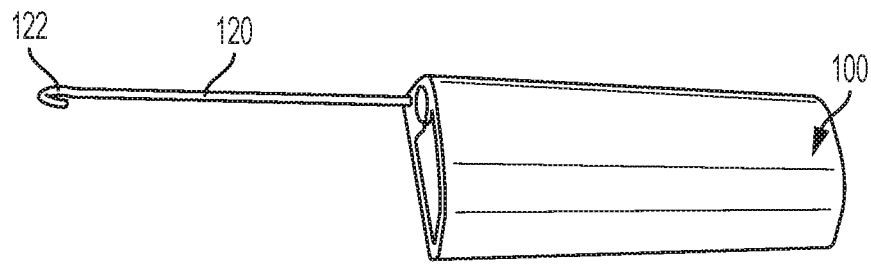
FIG. 4 shows the optical fiber pathway duct of FIG. 1 with a fish tape passing therethrough according to aspects of the present disclosure.
Figure 5:
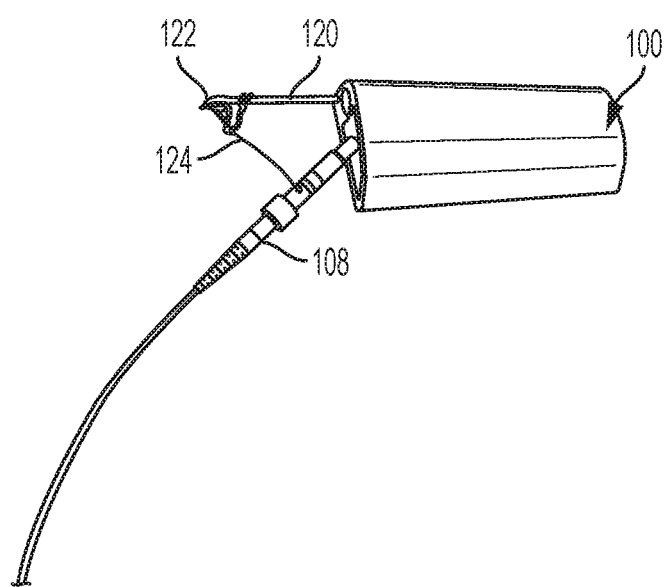
FIG. 5 shows the optical fiber pathway duct of FIG. 1, with the fish tape coupled to a pulling eye of the connector according to aspects of the present disclosure.

FIG. 3 shows the optical fiber pathway duct 100, and a fish tape 120 being inserted into the first channel 112 of the duct. The fish tape 120 is the pulling mechanism configured for coupling to a pullable connector 108 of a drop cable. FIG. 4 shows the fish tape 120 inserted through the first channel 112 of the duct 100. The fish tape 120 has a hook 122 at one end thereof. The hook 122 may be coupled to a string or pulling eye 124 of the pullable connector 108, as shown in FIG. 5. As the fish tape 120 is pulled back through the first channel 112, the pullable connector 108 is pulled through the second channel 114, and the pulling eye 124 passes through the slot 116 (shown in FIG. 2) connecting the first and second channels.

Figure 6:
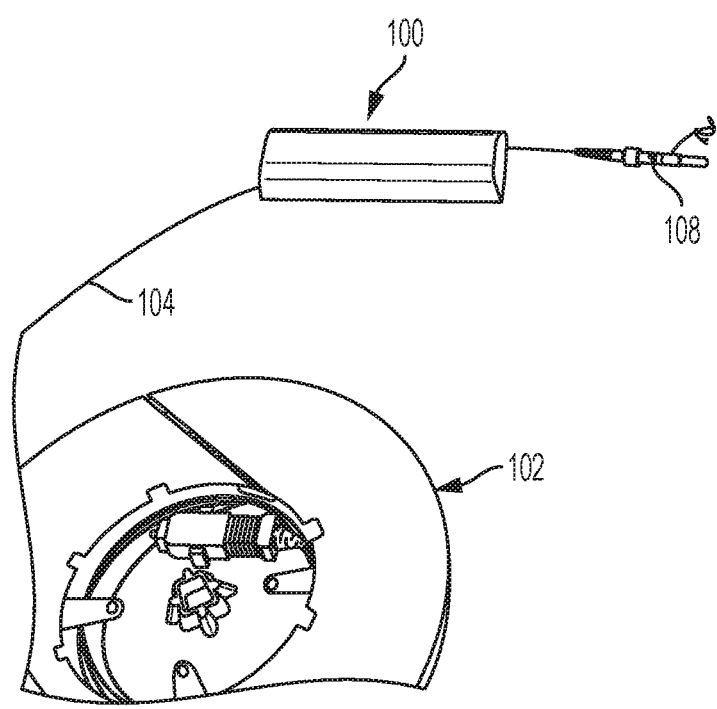
FIG. 6 shows the optical fiber pathway duct of FIG. 1, with the connector pulled through the duct according to aspects of the present disclosure.

FIG. 6 shows the pullable connector 108 having passed through the optical fiber pathway duct 100. After the pullable connector 108 is pulled through the pathway 100, it may be final-assembled to an SC APC or UPC or LC connector and interconnected at a wallbox or access point.

Various embodiments disclosed herein have several advantages. For example, the pathways have no strings or pre-installed optical fiber. This minimizes craft sensitivity on installation of the pathway and reduces the risk of damage to the optical fiber. The plug and play embodiments configured to provide connectorized cables as disclosed herein, as well as embodiments configured to provide stub end cables, allow installation by lower skilled technicians. Further, there is no risk of damaging or entangling the optical fibers, at least because the pathway ducts and pulling mechanism are segregated from the fiber storage, e.g. in reels.

Various embodiments further allow deferring the costs of the optical fiber to the time of installation. Moreover, installation time of pre-terminated optical fiber to subscribers will be reduced compared to the current method of cutting two windows, similar to mid-span techniques used today, pulling back, slack storing and fusing on the connector.

In various embodiments, the deployment reel may house optical fiber that is pre-terminated by a connector and/or has a stub end. In one example, the reel may house 900 μm optical fiber, which is pre-terminated, and slack is pre-stored. This allows for pulling the optical fiber as needed. It is to be understood that various embodiments may provide different types of optical fiber cable, for example having different lengths and different sizes (e.g. 900 μm, 1.2 mm or another size), which are either connectorized or have a stub end.

In some embodiments, up to 12 optical fiber cables may be installed into the same pathway duct. In other embodiments, more than 12 optical fiber cables may be installed into the same pathway, for example depending on footprint. In various embodiments, optical fibers cables may be deployed and installed through the optical fiber pathway duct one at a time as more subscribers are added.

Embodiments of the optical fiber pathway duct may be configured to accept a variety of drop cables, which allows the duct to be integrated into any network architecture and deployment. Various embodiments of the enclosure may be integrated into any network architecture and deployment. For example, the enclosure may be used in a fiber distribution system comprising one or more distribution terminals. In some embodiments, the fiber distribution system may comprise a plurality of distribution terminals arranged in a daisy chained configuration. A distribution terminal may have at least one feeder port and a plurality of distribution ports. Each of the at least one feeder port and the plurality of distribution ports may be sealable ports configured to receive a duct configured to receive pushable fiber therethrough or a connector, and the connector may be configured to interface with a drop type cable. The fiber distribution system may comprise an optical fiber pathway ducts configured according to aspects of the present disclosure. The ducts may be mounted at a user location such as an MDU.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. An optical fiber pathway duct comprising:
   a housing made of a flexible material configured to allow spooling of the housing and configured to protect an optical fiber cable;
   a first channel in the housing configured to receive a pulling mechanism;
   a second channel in the housing configured to allow one of a pullable connector and a stub end coupled to the optical fiber cable to pass through the housing; and
   a slot connecting the first channel and the second channel and configured to allow a pulling eye of one of the pullable connector and the stub end coupled to the pulling mechanism to pass through the housing,
   wherein the first channel has a first cross-sectional area and the second channel has a second cross-sectional area that is larger than the first cross-sectional area.

2. The optical fiber pathway duct of claim 1, wherein the second channel is further configured to house a plurality of previously deployed optical fiber cables.

3. An optical fiber pathway assembly comprising:
   a reel configured to store a pre-terminated optical fiber cable; and
   an optical fiber pathway duct comprising:
      a housing made of a flexible material configured to allow spooling of the housing and configured to protect the pre-terminated optical fiber cable,
      a first channel in the housing configured to receive a pulling mechanism,
      a second channel in the housing configured to allow a pullable connector of the pre-terminated optical fiber cable to pass through the housing, and
      a slot connecting the first channel and the second channel and configured to allow a pulling eye of the pullable connector coupled to the pulling mechanism to pass through the housing,
   wherein the first channel has a first cross-sectional area and the second channel has a second cross-sectional area that is larger than the first cross-sectional area.

4. The optical fiber pathway assembly of claim 3, wherein the second channel is further configured to house a plurality of previously deployed optical fiber cables.

5. The optical fiber pathway duct of claim 1, wherein the housing has an asymmetrical shape in a cross-sectional view.

6. The optical fiber pathway duct of claim 5, wherein the housing includes at least one flat section in the cross-sectional view.

7. The optical fiber pathway duct of claim 6, wherein housing further includes a curved section in the cross-sectional view.

8. The optical fiber pathway duct of claim 7, wherein an inner surface of the flat section and an inner surface of the curved section define a portion of the second cross-sectional area.

9. The optical fiber pathway duct of claim 8, wherein the flat section and the curved section meet at a point.

10. The optical fiber pathway duct of claim 1, wherein the second cross-sectional area has an asymmetrical shape.

11. The optical fiber pathway assembly of claim 3, wherein the housing has an asymmetrical shape in a cross-sectional view.

12. The optical fiber pathway assembly of claim 11, wherein the housing includes at least one flat section in the cross-sectional view.

13. The optical fiber pathway assembly of claim 12, wherein housing further includes a curved section in the cross-sectional view.

14. The optical fiber pathway assembly of claim 13, wherein an inner surface of the flat section and an inner surface of the curved section define a portion of the second cross-sectional area.

15. The optical fiber pathway assembly of claim 14, wherein the flat section and the curved section meet at a point.

16. The optical fiber pathway assembly of claim 3, wherein the second cross-sectional area has an asymmetrical shape.

* * * * *